United States Patent [19]

Uehara

[11] Patent Number: 4,568,845

[45] Date of Patent: Feb. 4, 1986

[54] MAGNETIC DRIVE UNIT

[75] Inventor: Kenji Uehara, Yokohama, Japan

[73] Assignee: Alps Electric Co., Ltd., Japan

[21] Appl. No.: 633,140

[22] Filed: Jul. 23, 1984

[30] Foreign Application Priority Data

Jul. 22, 1983 [JP] Japan .............. 58-114053[U]

[51] Int. Cl.$^4$ ............................. H02K 41/02
[52] U.S. Cl. .......................... 310/13; 310/27
[58] Field of Search ..................... 310/13, 27

[56] References Cited

U.S. PATENT DOCUMENTS 2,917,692  12/1959  Dubsky et al. .............. 310/27 X
3,743,870   7/1973  Hunt ........................... 310/13

Primary Examiner—Donovan F. Duggan
Attorney, Agent, or Firm—Guy W. Shoup; Robert Scobey

[57] ABSTRACT

A magnetic drive unit includes a magnetic circuit composed of a yoke and a magnet which define a magnetic gap therebetween, and a voice coil movably disposed in the magnetic gap for moving a driven member, the voice coil comprising turns formed by helically cutting a tubular conductive body, the turns being spaced at pitches which are larger within the magnetic gap and become progressively smaller in directions away from the magnetic gap. The turns are of a rectangular cross section and insulated by a mass of resin coated on their surfaces.

5 Claims, 5 Drawing Figures

MAGNETIC DRIVE UNIT

BACKGROUND OF THE INVENTION

The present invention relates to a magnetic drive unit including a voice coil and a magnetic circuit for moving a driver member such as an objective lens in an optical pickup in small intervals, and more particularly to a magnetic drive unit capable of moving the voice coil linearly in small intervals.

Recently available digital audio disc (DAD) players have an optical pickup for reading information recorded on a disc. The optical pickup has a magnetic drive unit for keeping an objective lens a constant distance from the disc at all times to focus a detecting beam spot on the information-recorded surface in the disc. FIG. 1 of the accompanying drawings is a side elevational view, partly in cross section, of a conventional magnetic drive unit 11'. The magnetic drive unit 11' operates on the same principle as that of an audie loudspeaker. The magnetic drive unit 11' includes a magnet 11b disposed centrally in a yoke 11c and a pole piece 11d bonded to an upper surface of the magnet 11b. The pole piece 11d and an upper flange 11e of the yoke 11c which confronts the pole piece 11d jointly define therebetween a magnetic gap 14 in which a voice coil 11'a is disposed. The voice coil 11'a supports thereon a driver member comprising an objective lens 8 held in confronting relation to the disc, which is denoted at 1. The objective lens 8 is moved vertically through small intervals by varying a current flowing through the voice coil 11'a. Another magnetic drive unit 12' with the yoke 11c serving as a drive member has a voice coil 12'a. The objective lens 8 can be moved horizontally in small intervals by varying a current flowing through the voice coil 12'a. A light beam emitted from an optical detector 15 comprising such as a laser diode is reflected by a prism 7 and focused by the objective lens 8 onto the information-recorded surface in the disc 1. The beam spot on the information-recorded surface in the disc 1 can be focused thereon through small movements of the objective lens 8 driven by the magnetic drive units 11', 12', and adjusted thereby to follow the tracks on the disc 1 accurately. In the field of the optical pickup, the magnetic drive unit 11' is called a "focusing servomechanism" and the magnetic drive unit 12' is called a "tracking servomechansim".

The voice coil 11'a is normally constructed of windings of a copper wire. Since the copper wire is of a round cross section, the coil windings have a poor space factor. The space factor is particularly low where the coil has a plurality of winding layers. To cope with this, there has been proposed to construct the voice coil 11'a of windings of a wire having a rectangularly cross section which gives a better space factor. However, when such a wire is wound, the radially outward portion of the coil is subjected to a tensile stress, while the radially inward portion undergoes a compressive stress, with the result that the coil will be distorted during the manufacturing process. Another proposal is a printed coil which however is required to be produced in a complex manufacturing process and hence is costly to fabricate.

The voice coil 11'a has a uniform winding density. The magnetic field generated in the magnetic gap 14 between the flange 11e of the yoke 11c and the pole piece 11d has a high flux density in its central area, the flux density becoming progressively lower in a direction away from the central area. Accordingly, the force acting on the voice coil 11'a tends to vary as the voice coil 11'a is moved in the magnetic gap 14.

SUMMARY OF THE INVENTION

With the conventional shortcomings in view, it is an object of the present invention to provide a magnetic drive unit including a voice coil which has a high space factor and which can be linearly moved in small intervals.

According to the present invention, there is provided a magnetic drive unit including a magnetic circuit composed of a yoke and a magnet which define a magnetic gap therebetween, and a voice coil movably disposed in the magnetic gap for moving a driven member, the voice coil comprising turns formed by helically cutting a tubular conductive body, the turns being spaced at pitches which are larger within the magnetic gap and become progressively smaller in directions away from the magnetic gap. The turns are of a rectangular cross section and insulated by a mass of resin coated on their surfaces.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
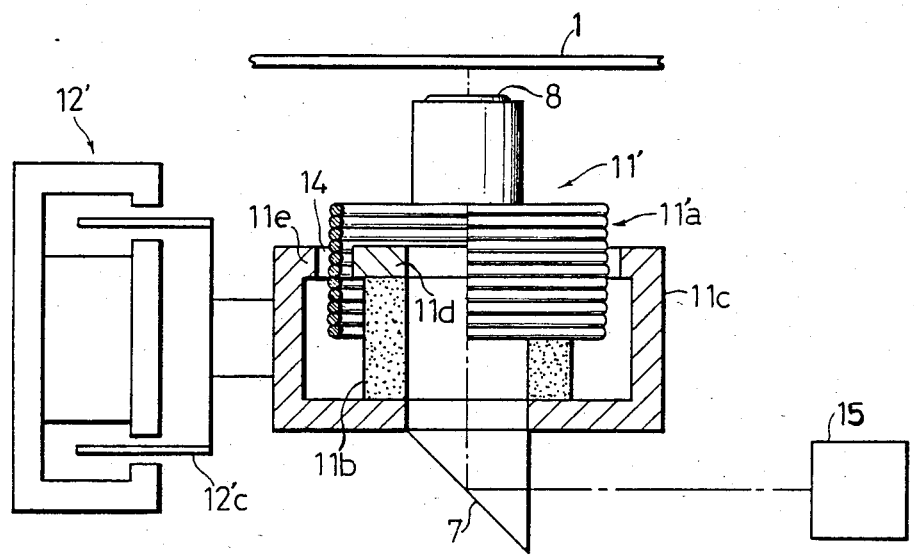
FIG. 1 is a side elevational view, partly in cross section, of a conventional magnetic drive unit.
Figure 2:
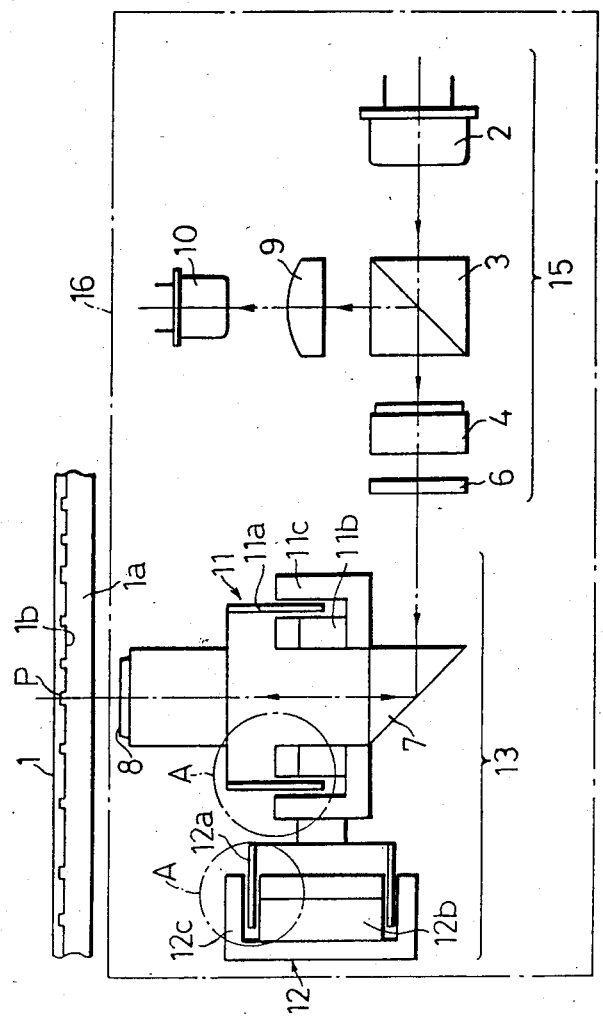
FIG. 2 is a schematic view of an optical pickup having magnetic drive units according to the present invention.

As shown in FIG. 2, an optical pickup 16 for use in a DAD player comprises an actutator 13 for driving an objective lens 8 under servo control, and an optical detector 15. The optical detector 15 is composed of a laser diode 2, a beam splitter 3, a collimating lens 4, a ¼-wave plate 6, a cylindrical lens 9, and a photodiode 10.

The actuator 13 includes magnetic drive units comprising a focusing servomechanism 11 and a tracking servomechanism 12, which are of the same construction. More specifically, magnets 11b, 12b are disposed centrally in yokes 11c, 12c, respectively, and voice coils 11a, 12a are disposed in magnetic gaps 14 in magnetic circuits composed of the yokes 11c, 12c and the magnets 11b, 12b. An objective lens 8 serving as a driven member is mounted on the voice coil 11a, and the other voice coil 12a is connected to the yoke 11c which also serves as a driven member. The focusing servomechanism 11 moves in small intervals for focusing a beam spot emitted from the objective lens 8 on the information-recorded surface 1b in the disc 1. The tracking servomechanism 12 moves in small intervals for enabling the beam spot to follow tracks of pits p on the information-recorded surface 1b in the disc 1.

Figure 3:
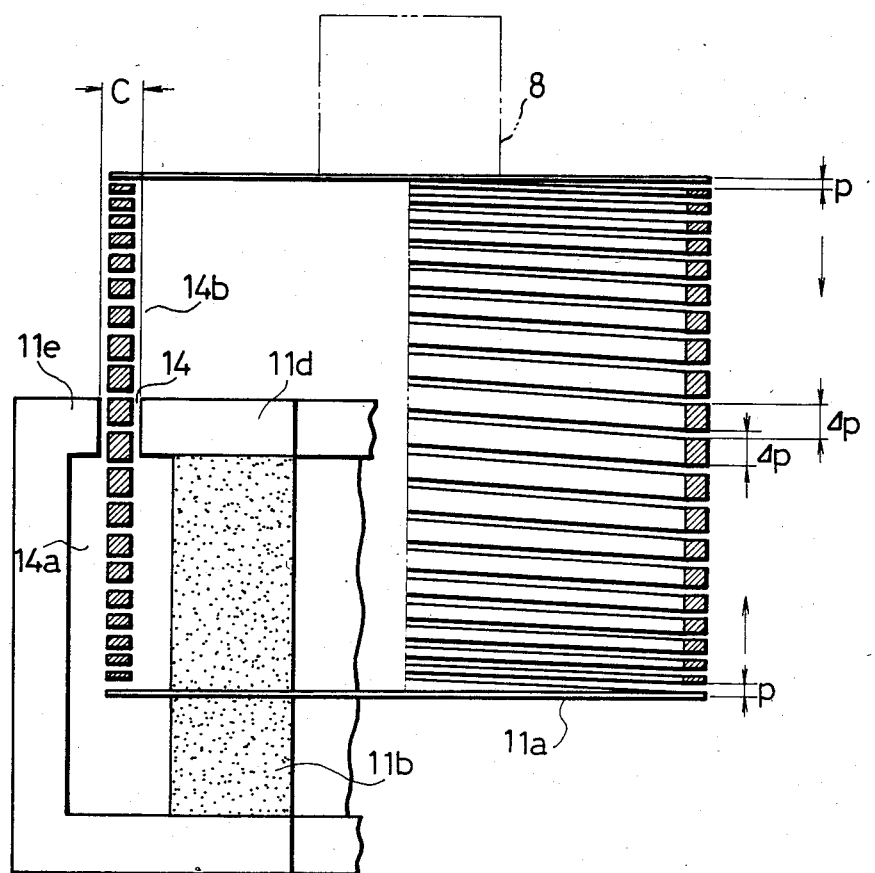
FIG. 3 is an enlarged cross-sectional view of portions encircled at A in FIG. 2.

FIG. 3 illustrates at an enlarged scale each of encircled portions A in FIG. 2. Since the focusing servomechanism 11 and the tracking servomechanism 12 are of the same construction, only the focusing servomechanism 11 will hereinafter be described.

Figure 4:
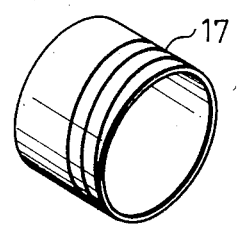
FIG. 4 is a perspective view of a means for forming a voice coil.

A magnetic gap 14 having a width C is defined between an upper flange 11e of the yoke 11c and a pole piece 11d bonded on an upper surface of the magnet 11b in confronting relation to the flange 11e. The voice coil 11a disposed in the magnetic gap 14 is formed by cutting a tubular conductive body 17 along a helical path as shown in FIG. 4. The tubular conductive body 17 may be cut by a lathe or laser. As shown in FIG. 3, a pitch P at which the cutter or laser beam is fed along during machining operation is progressively greater (from P to ΔP) while the cutter or laser beam goes from the center of the conductive body 17 to its opposite ends. Accordingly the number of turns per unit length of the voice coil 11a is progressively greater from the center thereof toward the opposite ends thereof. The cut wire is of a rectangular cross section. After the voice coil has been machined, a coating of resin, for example, is deposited on the cut surfaces and the inner and outer peripheral surfaces of the coil to insulate the cut turns. The voice coil 11a thus fabricated is vertically movably supported, together with the objective lens 8 for example, by a leaf spring. Under normal conditions, a portion of the voice coil 11a which has the pitch ΔP is positioned in the magnetic gap 14.

Information reading operation of the optical pickup will be described.

The disc 1 is clamped on a turntable (not shown) and rotated thereby. A beam emitted from the laser diode 2 in the optical detectgor 15 passes through the beam splitter 3, the collimating lens 4, and the ¼-wave plate 6, and is then reflected by the prism 7 toward the objective lens 8. A beam spot is radiated from the objective lens 8 onto the information-recorded surface 1b in the disc 1. The beam reflected from the disc surface 1b goes through the objective lens 3 and changes its direction through 90° in the beam splitter 3 to travel through the cylindrical lens 9. The beam is then detected by the photodiode 10 for reading information therefrom.

Operation of the magnetic drive units is as follows: The focusing servomechanism 11 is actuated to focus the beam spot from the objective lens 8 on the disc surface 1b. More specifically, when a current flowing through the voice coil 11a is varied, the voice coil 11a is slightly moved vertically in FIG. 3 to drive the objective lens 8. Since the number of turns of the voice coil 11a per unit length is progressively increased from the center of the voice coil toward the ends thereof, the flux density distribution (which is progressively coarser in directions away from the center of the magnetic gap 14) in the magnetic gap 14 can effectively utilized for moving the voice coil 11a linearly. Specifically, in a position where the flux density is small away from the magnetic gap 14, an effective electromagnetic force can be generated as the number of turns of the voice coil 11a is large in such a position close to the ends of the voice coil 11a.

Due to the influence of a flux leakage from a side of the magnet 11b within the yoke 11c, the flux densities at positions 14a, 14b away from the magnetic gap 14 are asymmetrical with respect to the magnetic gap 14. With the number of turns of the voice coil 11a being increased and selected appropriately in such positions remote from the magnetic gap 14, the influence of the asymmetrical flux densities can be reduced, and any variations in the electromagnetic force which would be caused by movement of the voice coil 11a into the yoke 11c can also be reduced, thereby providing a linear driving force.

In the tracking servomechanism 12 having the other magnetic drive unit, a current is passed through the voice coil 12a to enable the beam spot to follow the tracks on the disc 1. When such a current is varied, the voice coil 12a moves the focusing servomechanism 11 as a whole in horizontal directions. At this time, the voice coil 12a is also linearly moved in the manner described above since the voice coil 12a is of the same construction as that of the voice coil 11a.

Figure 5:
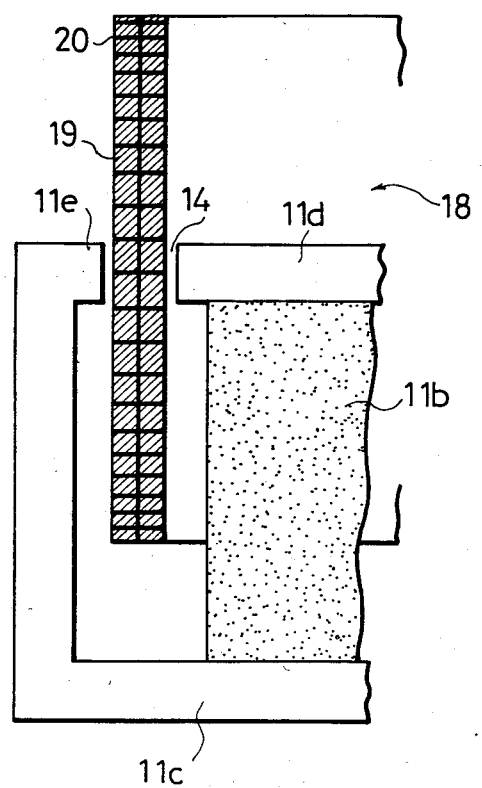
FIG. 5 is an enlarged cross-sectional view of a magnetic drive unit according to another embodiment of the present invention.

FIG. 5 shows at an enlarged scale a magnetic drive unit according to another embodiment of the present invention. The magnetic drive unit, generally designated at 18, is composed of a yoke 11c having an upper flange 11e, a magnet 11b disposed in the yoke 11c, a pole piece 11d mounted on an upper surface of the magnet 11b, and a double-layer voice coil 19 including an insulating material 20 and disposed in a magnetic gap 14 defined between the flange 11e and the pole piece 11d. The layers of the voice coil 19 are formed in the same manner as that in which the voice coil 11a of FIG. 3 is formed. Because of the double-layer construction, the voice coil 19 has a better response when moved in small intervals.

In the above embodiments, the voice coils 11a, 12a, 19 have different numbers of turns per unit length which are achieved by varying the pitch at which the cutter or laser beam is fed along during machining operation. Howver, the tubular conductive body as shown in FIG. 4 may be cut at equal pitches, and thereafter the voice coil may be elongated in its central portion to increase the pitches therein and the increased pitches may be fixed by a mass of resin placed between the adjacent turns. The magnetic drive unit may be incorporated in an audio loudspeaker.

The prevent invention is advantageous for the following reasons:

(1) Since a voice coil is formed by helically cutting a tubular conductive body, the efficiency of making the voice coil is much higher than possible with a conventional process in which a wire is wound to form a voice coil.

(2) The turns of the voice coil have a distortion-free rectangular cross section, and hence the voice coil has an increased space factor. Therefore, the magnet can be smaller in size, and the magnetic drive unit can also be smaller in size.

(3) The pitches of the helical turns of the voice coil are relatively large in the magnetic gap between the yoke and the magnet, and become progressively smaller in direction away from the magnetic gap. As a consequence, the influence due to a varying flux distribution of a magnetic field generated in the magnetic gap is reduced to allow the voice coil to move linearly.

(4) As the voice coil is formed by helically cutting a tubular conductive body, as described above, it has a uniform diameter and a uniform thickness throughout its axial length. This can reduce the width C (FIG. 3) of the magnetic gap 14 to as small an extent as possible. Accordingly, the voice coil can efficiently utilize the magnetic field produced in the magnetic gap, and the magnetic drive unit can be reduced in size.

Although certain preferred embodiments have been shown and described, it should be understood that many changes and modifications may be made therein without departing from the scope of the appended claims.

What is claimed is:

1. A magnetic drive unit comprising a magnetic circuit composed of a yoke and a magnet which define a magnetic gap therebetween, and a voice coil movably disposed in said magnetic gap for moving a driven member, said voice coil comprising helical turns that are spaced at pitches which are larger within said magnetic gap and become progressively smaller in directions away from said magnetic gap.

2. A magnetic drive unit according to claim 1, wherein said turns have a rectangular cross section.

3. A magnetic drive unit according to claim 1, wherein said turns are insulated by a mass of resin coated on their surfaces.

4. A magnetic drive unit according to claim 1, wherein said turns are in a single layer.

5. A magnetic drive unit according to claim 1, wherein said turns are in a pair of layers with a mass of resin inserted therebetween.

* * * * *